United States Patent [19]

Borgo

[11] 3,731,771
[45] May 8, 1973

[54] PNEUMATIC-HYDRAULIC SHOCK ABSORBER

[75] Inventor: Norman J. Borgo, Coraopolis, Pa.

[73] Assignee: Pittsburgh Forgings Company, Coraopolis, Pa.

[22] Filed: Feb. 17, 1972

[21] Appl. No.: 227,063

[52] U.S. Cl. ............... 188/289, 188/269, 188/314, 188/320, 213/43, 267/115
[51] Int. Cl. ........................... F16f 9/06, B61g 9/08
[58] Field of Search .............. 188/269, 289, 320, 188/314; 213/43, 8; 267/115

[56] References Cited

UNITED STATES PATENTS

| | | | |
|---|---|---|---|
| 2,808,131 | 10/1957 | Heckethorn | 188/314 |
| 3,252,587 | 5/1966 | Scales | 213/43 |
| 3,567,042 | 3/1971 | Borgo | 188/269 X |

Primary Examiner—George E. A. Halvosa
Attorney—Russell D. Orkin

[57] ABSTRACT

My improvement is directed to a pneumatic-hydraulic shock absorber having a high pressure chamber formed by a cylinder and a low pressure chamber formed in the hollow portion of a piston slidably mounted in the cylinder. The shock is absorbed by a throttling action of a metering pin positioned in a deflector tube which connects the two chambers and the entrapped gas and foam which settle out in the high pressure chamber is returned to the low pressure chamber means by a passageway therebetween. The improvement is a bulkhead which partitions the low pressure chamber into two separate chambers connected through a sloped tube extending through the bulkhead. Baffles and deflector plates are employed in one of the partitioned chambers to control the movement of fluid so as to prevent the entrapment and transfer of gas into the high pressure chamber.

4 Claims, 5 Drawing Figures

PNEUMATIC-HYDRAULIC SHOCK ABSORBER

This invention relates to a pneumatic-hydraulic shock absorber and, more particularly, to an improved shock absorber for use in the horizontal position with a railway car coupler.

A shock absorber, when used in conjunction with a coupler for joining railway cars, must be able to withstand severe impact in both the draw and buff position. Such shock absorbers are taught by Scales U.S. Pat. No. 3,252,587, issued May 24, 1966, and my improvement patent thereover, U.S. Pat. No. 3,567,042, issued Mar. 2, 1971.

A shock absorber of the type taught in the Scales patent employed a high pressure liquid chamber and a connecting compressed gas-liquid chamber. However, the gas in the gas-liquid chamber found its way into the high pressure liquid chamber during use and ultimately settled out as gas and foam in the high pressure chamber. Because the gas and foam in the high pressure chamber has a greater compressibility than the liquid, the initial impact compresses the fluid and foam, thus delaying the desired cushioning effects. My improvement patent solved this problem by providing a passageway to remove the gas from the liquid chamber and return it to the gas-liquid chamber.

My patented pneumatic-hydraulic shock absorber improvement proved quite successful during tests in which the shifting locomotives had plenty of power to handle the test cars and, thus, cause a sufficient impact to the "hammer" car and the backup cars.

However, where small industrial yard-type locomotives were employed and the power generated was modest, the "hammer" car was not accelerated adequately to exercise the plunger sufficiently to purge the settled gas through the passageway and out of the oil on the high pressure side after impacts at speed.

My subject invention overcomes the aforementioned drawbacks in that the shock absorber is amenable to modest power locomotives, as well as large locomotives which generate sufficient acceleration. To accomplish this, I have controlled the turbulence which entrains gases during impact to thereby minimize the amount of gas which enters the high pressure chamber in the first instance. This, therefore, permits the expended energy to be immediately absorbed by the controlled fluid flow.

My invention divides the known low pressure chamber into two separate chambers partitioned from one another by a bulkhead and in communication with one another through a sloped tube which extends through the bulkhead and communicates with the top portion of the first chamber and the bottom portion of the second chamber. Additional baffle plates and deflector plates are employed within the first chamber to control turbulence during different cycles of the shock absorber.

In the accompanying drawings, I have shown one preferred embodiment of my invention in which.

Figure 1:
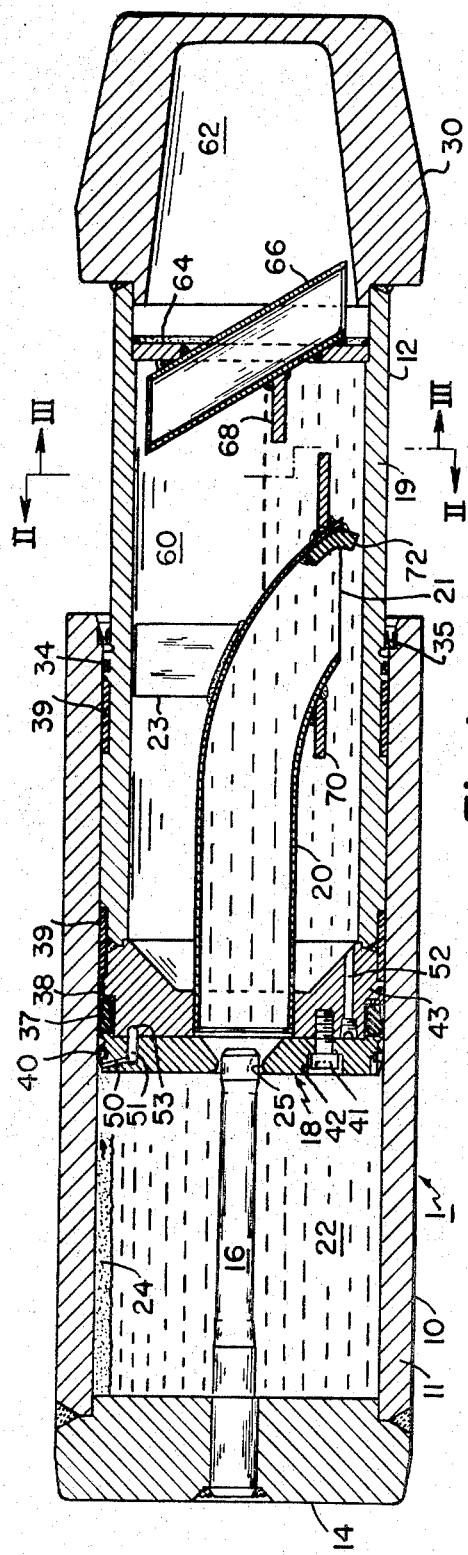
FIG. 1 is a section of my shock absorber in a horizontal position.

The known shock absorber 1 is firmly mounted on the frame of a railway car (not shown). The shock absorber 1 is positioned horizontally for operation with a conventional railway car coupler (not shown). The shock absorber 1 includes a cylinder 10 and a hollow piston 12, hereinafter called a plunger, FIG. 1. The cylinder 10 includes a head plate 14 and a tubular wall 11. The plunger 12 includes tubular sidewall 19, end wall 18 and a striker 30 which receives the buff or impact during use. The plunger 12 is hollow and forms the gas-liquid or low pressure chamber. The head plate 14 of cylinder 10, tubular wall 11 and end wall 18 of the plunger 12 forms the liquid or high pressure chamber 22. The plunger 12 is slidably mounted in cylinder 10 and the plunger and cylinder are movable relative to each other. Standard stops (not shown) limit the plunger-cylinder in the open position and depend from the frame and are positioned at either end of the shock absorber 1. In other words, a buffer impact against striker 30 forces the plunger 12 into the cylinder 10 which is held in place by its respective stops. On the other hand, a draw on the coupler engages a yoke (not shown) which pulls the cylinder 10 over the plunger 12 which is held in place by its respective stops.

A passageway 25 extends through the plunger end wall 18 into the high pressure chamber 22. A deflector tube 20 extends from the plunger end wall 18 about passageway 25 into the low pressure chamber. A metering pin 16 attached to the cylinder head plate 14 extends through the passageway 25 into the deflector tube 20 to throttle the passage of liquid between chambers and build up the resistance to impact. Deflector tube 20 is further secured in place by rib 23 which connects between the deflector tube 20 and the tubular sidewall 19.

The necessary seals, wipers and rings are employed to insure proper sealing of the plunger 12 and cylinder 10. Inner and outer wipers 34 and 35, respectively, main seal 37, backup ring 38 and piston ring 40 are provided for that purpose. Nylon bearings 39 between the plunger 12 and cylinder 10 are provided to minimize frictional interference during the relative movement of the plunger and cylinder.

The gas-liquid or low pressure chamber is actually made up of two chambers, 60 and 62, separated by means of a bulkhead 64 secured to the tubular sidewall 19. Chamber 60 accommodates the deflector tube 20, whereas chamber 62 is terminated by the striker 30.

A vent 50 connects at the uppermost corner of chamber 22 immediately adjacent piston ring 40 and extends into a passageway 51 which extends to the piston end wall 18 and into a transfer groove 53. The piston end wall 18 is actually made in two sections, 42 and 43, which are joined to form the end wall 18 by socket screws 41. Transfer groove 53 is recessed into wall 43; however, it may be recessed in either wall or could be recessed in both walls to form a continuous annular groove within the end wall 18. Transfer groove 53 exits at exhaust port 52 which leads into the bottom portion of chamber 60 at a point remote from the deflector tube mouth 21.

Figure 3:
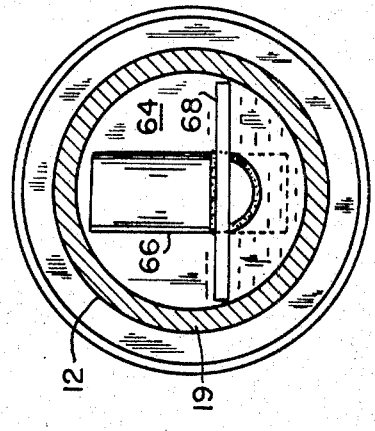
FIG. 3 is a section taken along section lines III—III of FIG. 1.
Figure 2:
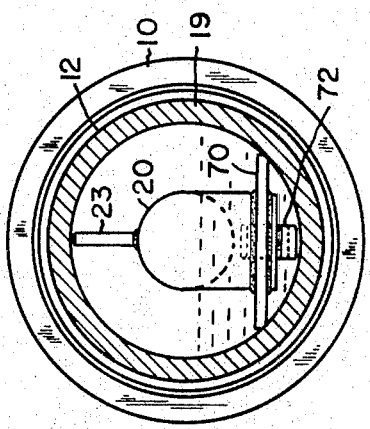
FIG. 2 is a section line taken along section lines II—II of FIG. 1.

Chamber 60 and chamber 62 communicate with each other by means of sloped tube 66 which extends through and is connected to the bulkhead 64, FIGS. 1–3. Tube 66 communicates with chamber 60 at substantially the top thereof and communicates with chamber 62 at substantially the bottom thereof.

A baffle plate 68 extends into chamber 60 and is connected to the sloped tube 66 in the area where the sloped tube 66 first passes through bulkhead 64, FIG. 3. A second baffle 70 is secured to the deflector tube 20 within chamber 60, FIG. 2. Baffle 70 extends outward in both directions from deflector tube 20 and is dimensioned to extend all the way to the cylinder wall 19. Baffle 70 is positioned just above the mouth 21 of deflector tube 20 within the chamber 60.

A deflector finger 72 is secured to the inner surface of the deflector tube 20 in the area of the mouth 21 and extends therefrom for a short distance, FIGS. 1 and 2. The deflector finger 72 is added to the deflector tube 20 to break up the current caused by liquid issuing from the tube mouth 21 during impact compression. The finger deflector 72 impedes the flow to prevent any siphon type currents from forming at the deflector tube mouth 21 which could pull the gas under the baffle 70 and into the high pressure chamber 22 through tube 20 during the subsequent restoration stroke.

A liquid such as oil is inserted into the chambers through a standard inflation valve (not shown) cooperating with chamber 62. Enough oil is employed to totally fill up the high pressure chamber 22 and a substantial portion of chamber 60 so that the deflector tube mouth 21 is always immersed. A compressed gas such as compressed nitrogen is also introduced through the standard inflation valve and the nitrogen fills up the area above the oil in chamber 60 and substantially all of chamber 62. After the initial use of the shock absorber 1, a slight amount of oil will remain in chamber 62 below the mouth of the sloped tube 66. The above conditions are for the shock absorber 1 in the fully extended position, FIG. 1.

Upon an impact or buff to the striker 30 or a draw on the cylinder 10, the oil is forced out of the chamber 22, through the duct 20 and into chamber 60. Oil only enters chamber 62 when the level in chamber 60 is sufficiently high to enter sloped tube 66. The return stroke draws all but a small residual amount of the oil out of chamber 62 and into chambers 60 and 22. The build-up of any settled out gases and foam 24 in chamber 22 is removed through the passageways by normal train movement which actually pumps out the gas and foam. This assures a complete oil phase in the high pressure chamber 22 preparatory to receiving another impact or draw.

My various improvements substantially reduce the amount of settled out gas and foam which gets into the high pressure chamber 22 in the first instance. The addition of the bulkhead 64 shortens the internal chamber length of the plunger 12, thereby raising the static oil level. The sloping tube 66 is arranged so that during a relatively violent impact compression, it only accepts gas at its top end, excluding oil to the chamber 62 and, thus, maintaining a higher oil level in the chamber 60 during compression and return strokes. The benefit of this higher oil level in chamber 62 is to prevent the entrainment of gas during impact as a result of oil surging from one end to the other and drawdown currents from gulping gas into the deflector tube 20 during the restoration travel. The tube 66 still permits all of the gas volume to act as a gas spring for returning the plunger 12 to its extended position.

Baffle 68 prevents violent upflow of oil into the generally overlying gas pocket during compression travel. Baffle 70 prevents drawdown currents of gas during return oil flow into the submerged mouth 21 of the deflector tube 20.

Figure 4:
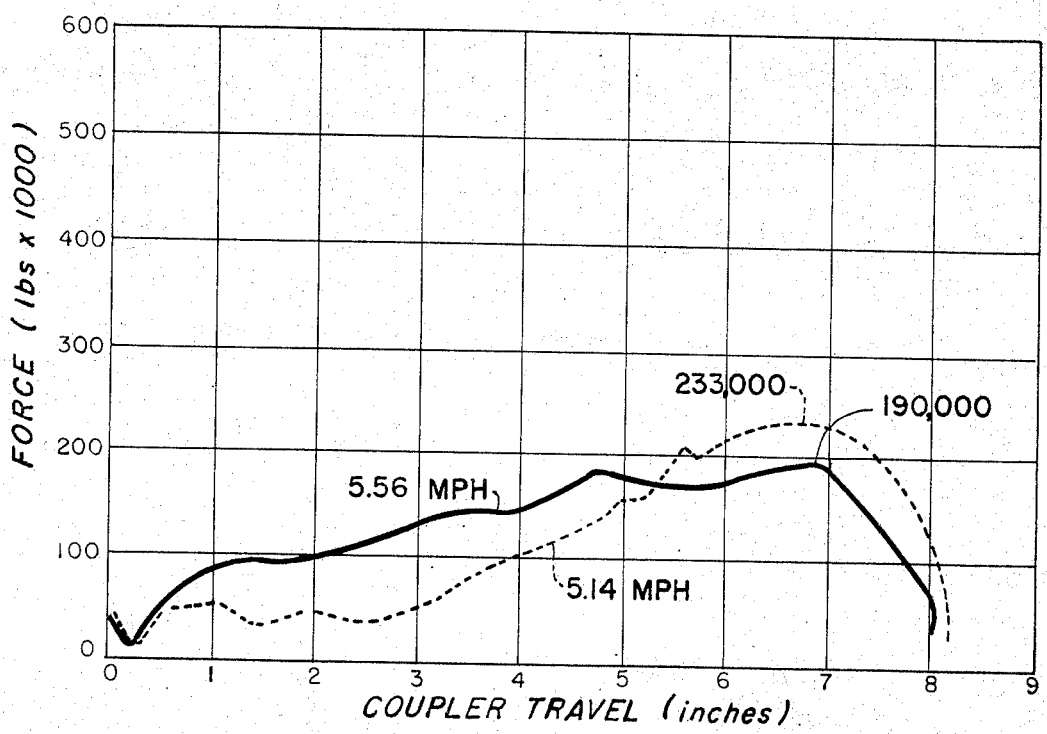
FIG. 4 is a force-time curve showing the improvement of my invention at impact speeds in excess of five mph.
Figure 5:
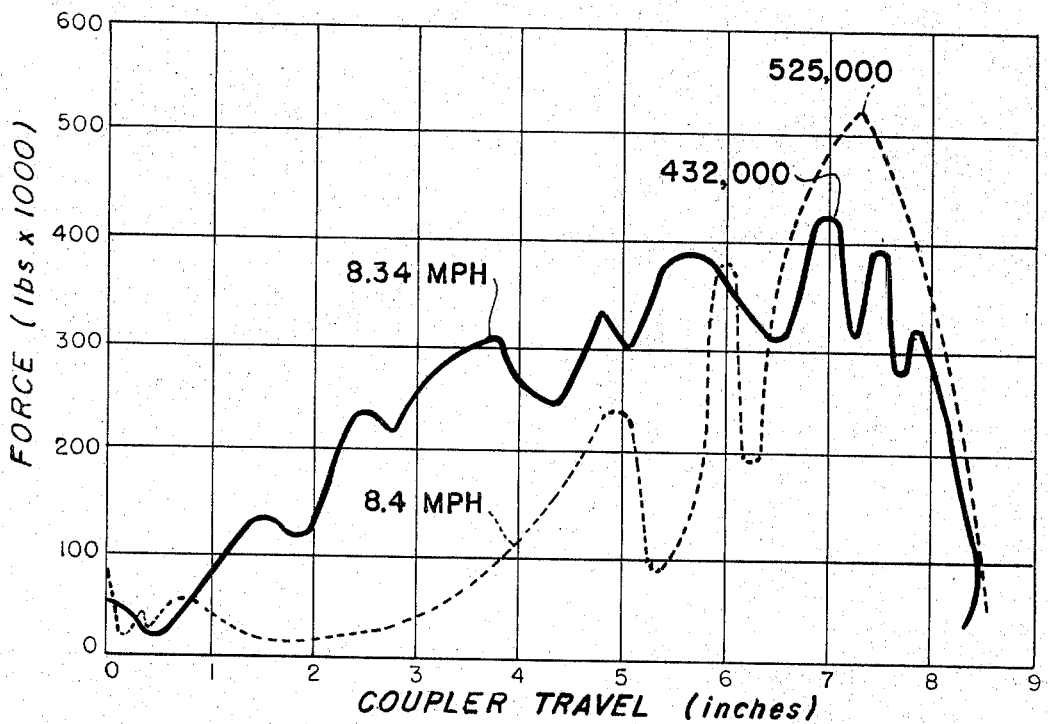
FIG. 5 is a force-time curve showing the improvement of my invention at impact speeds in excess of eight mph.

The added improvement obtained through my subject shock absorber over my patented shock absorber, U.S. Pat. No. 3,567,042, is illustrated in FIGS. 4 and 5 which show force-time curves for the shock absorber at different speeds of impact. The abscissa of each curve represents a distance traveled by the coupler which is the same as the distance traveled by the plunger in the cylinder. The ordinant of each curve represents a measured force on the shock absorber at the given increment of travel of the coupler or plunger in the cylinder. Each test was conducted on a shock absorber which had received a previous constant impact. The dotted line represents a force-travel curve for the shock absorber taught by my patent, whereas the solid line represents the force-travel curve for my improved shock absorber. The speeds shown on the curves in the figures represent the speed of the railroad car at impact to a stationary railway car mounted with the shock absorber.

At slightly over five mph, 233,000 pounds of force had to be dissipated by the known shock absorber, whereas my improved shock absorber required a maximum force build-up of 190,000 pounds or approximately 20 percent less, FIG. 4.

The known shock absorber required a force build-up of 525,000 pounds at 8.4 mph, whereas my improved shock absorber required an ultimate force of only 432,000 pounds at 8.34 mph, an approximate 18 percent improvement. In addition to the improvement of less ultimate force required, my improved shock absorber shows a proportional distribution of force over the entire travel of the plunger, whereas the known shock absorber shows a more disproportionate build-up of force with the majority of resistance occuring late in the travel of the plunger.

I claim:

1. In a shock absorber having a high pressure liquid chamber formed by a hollow cylinder, a low pressure gas and liquid chamber means formed by a hollow piston slidably mounted for horizontal movement in the cylinder, a deflector tube extending through the piston end wall and connecting the two chambers, a metering pin mounted to the high pressure chamber and adapted to operate within the deflector tube and a passageway extending through the piston end wall from substantially the top of said high pressure chamber to substantially the bottom of said low pressure chamber means, the improvement comprising the low pressure gas and liquid chamber means including a first and second chamber separated by a bulkhead said second chamber being substantially free of liquid in at least an extended position, the first chamber communicating with the high pressure chamber by means of the deflector tube and communicating with the second chamber by means of a sloping tube extending through the bulkhead communicating substantially the top of the first chamber with substantially the bottom of the second chamber.

2. The improvement of claim 1 including a first baffle means extending into the first chamber in the area of the bulkhead-sloping tube jointure to prevent the violent upflow of liquid into the overlaying gas pocket.

3. The improvement of claim 2 including a deflector finger extending downward from a leading end of a mouth of the deflector tube into the first chamber to break up the current caused by liquid issuing from the mouth of the deflector tube.

4. The improvement of claim 3 including a second baffle means secured to the deflector tube and extending into the first chamber from just above the mouth of the deflector tube to prevent a downward suctioning of gas into the deflector tube from the overlapping gas pocket during a return stroke of the liquid into the high pressure chamber.

* * * * *